(12) United States Patent
Miyajima

(10) Patent No.: US 6,801,403 B2
(45) Date of Patent: Oct. 5, 2004

(54) DISK APPARATUS HAVING INERTIA LATCH

(75) Inventor: Keiichi Miyajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 169 days.

(21) Appl. No.: 10/104,239

(22) Filed: Mar. 22, 2002

(65) Prior Publication Data

US 2003/0086210 A1 May 8, 2003

(30) Foreign Application Priority Data

Nov. 8, 2001 (JP) ........................................ 2001-343655

(51) Int. Cl.[7] ............................ G11B 5/54; G11B 21/22
(52) U.S. Cl. .................................................. 360/256.4
(58) Field of Search .......................... 360/256.4, 256.5, 360/256

(56) References Cited

U.S. PATENT DOCUMENTS

| | | | | |
|---|---|---|---|---|
| 4,989,108 A | * | 1/1991 | Chang ..................... | 360/256.3 |
| 5,734,527 A | * | 3/1998 | Reinhart .................. | 360/256.2 |
| 6,381,103 B1 | * | 4/2002 | Misso et al. ............. | 360/256.2 |
| 6,498,703 B2 | * | 12/2002 | Misso et al. ............. | 360/256.4 |
| 6,567,242 B2 | * | 5/2003 | Misso et al. ............. | 360/265.1 |
| 6,574,073 B1 | * | 6/2003 | Hauert et al. ............ | 360/137 |
| 6,624,980 B1 | * | 9/2003 | Watson et al. .......... | 360/256.4 |

\* cited by examiner

Primary Examiner—Angel Castro
(74) Attorney, Agent, or Firm—Greer, Burns & Crain, Ltd.

(57) ABSTRACT

A disk apparatus includes a disk in which information is recorded, a carriage arm having a head slider provided at a tip thereof, the head slider moving over the disk during a read/write operation and being placed at an evacuated position outside an area of the disk during a halt of the disk apparatus, and a support base. An inertia latch mechanism slides on the support base from an original position to a latch position in response to an impacting force so as to latch the carriage arm when the disk apparatus is impacted, and slides on the support base from the latch position to the original position by disengaging from the carriage arm after dissipation of the impacting force. The support base and the inertia latch mechanism are in contact with each other through at least one raised portion that prevents a single surface-to-surface contact from being dominant between the support base and the inertia latch mechanism.

8 Claims, 11 Drawing Sheets

DISK APPARATUS HAVING INERTIA LATCH

BACKGROUND OF THE INVENTION

1. Field of the Invention

The present invention generally relates to disk apparatuses, and particularly relates to a disk apparatus provided with a carriage arm that has a head slider at the tip thereof and are supported by a chassis so as to be able to swing.

2. Description of the Related Art

Hard-drives that magnetically store information therein are typically used as built-in components inside computers. Notebook-type portable computers often suffer impact when they are accidentally hit or dropped. Hard-drives provided as built-in components inside the notebook-type computers are therefore required to have a structure that is more robust against impact than the hard-drives provided in desktop-type computers.

The hard-drives that are built-in components of notebook-type computers employ a ramp-load scheme in which a head slider is evacuated out of the disk space when the hard-drive comes to a halt, thereby improving an anti-impact performance. In addition, an inertia latch mechanism is employed that operates when relatively great impact is applied in a direction in which the carriage arm moves. The inertia latch latches the carriage arm so as to prevent the rotation thereof, thereby preventing the head slider from jumping on to the halted disk and sliding thereon to destroy data recorded in the disk.

The inertia latch mechanism needs to operate reliably when there is impact, and also needs to release the carriage arm reliably thereafter. If releasing is not complete, the carriage arm cannot swing when a load command is supplied, resulting in a malfunction of the hard-drive.

Figure 1A:
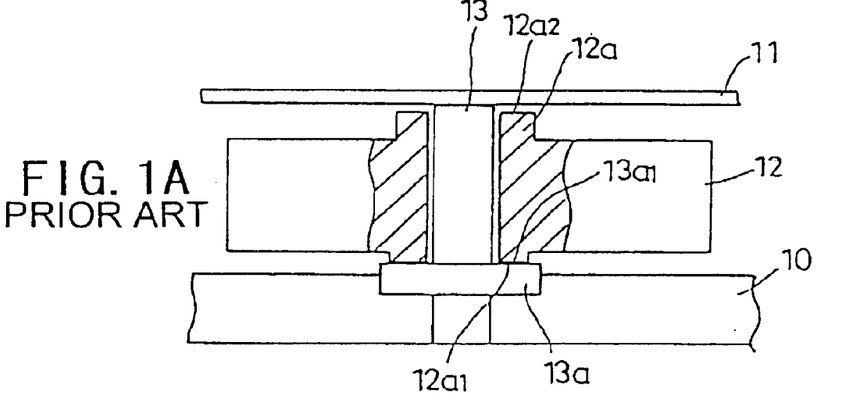
FIGS. 1A and 1B are illustrative drawings showing a related-art inertia latch mechanism that is provided in a hard-drive.
Figure 1B:
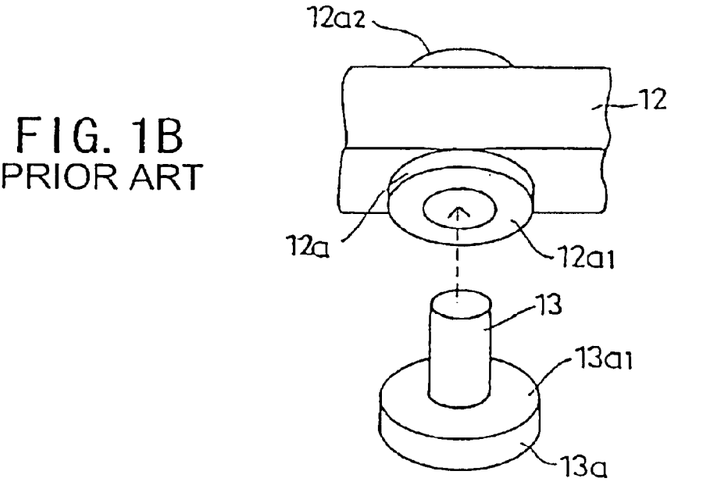

FIGS. 1A and 1B are illustrative drawings showing a related-art inertia latch mechanism that is provided in a hard-drive. A chassis base 10, a cover 11, and a latch arm 12 for latching a carriage arm are shown. The latch arm 12 has a bearing 12a thereof that engages in a fixed axis 13 standing on the chassis base 10, so that the latch arm 12 can swing around the fixed axis 13.

The latch arm 12 is attracted by a magnetic flux leaking from a magnetic circuit of the actuator so as to stay at a latch release position. When relatively great impact is applied, the latch arm 12 swings and reaches a latch position where it latches the carriage arm, thereby preventing the carriage arm from rotating. When an impact force dissipates, the latch arm 12 is attracted by the magnetic flux again to return to its original position.

The bearing 12a of the latch arm 12 has circular flat surfaces 12a1 and 12a2 on the lower and upper ends thereof, respectively. The circular flat surface 12a1 is placed upon a circular flat surface 13a1 of a flange portion 13a of the fixed axis 13. In this manner, the bearing 12a of the latch arm 12 maintains a surface-to-surface contact with the flange portion 13a of the fixed axis 13. The latch arm 12 swings by sliding, overcoming the resistance caused by friction of the surface contact. The circular flat surface 12a1 of the latch arm 12 and the circular flat surface 13a1 of the flange portion 13a have relatively large friction caused by the surface contact. This may undesirably prevent smooth rotation of the latch arm 12.

If the rotation of the latch arm 12 returning to its original position after the dissipation of an impacting force is not complete, the releasing of the carriage arm by the latch ends up being incomplete. This results in the carriage arm failing to swing when a load command is supplied, thereby causing a malfunction of the hard-drive.

SUMMARY OF THE INVENTION

It is a general object of the present invention to provide a disk apparatus that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a disk apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, a disk apparatus according to the present invention includes a disk in which information is recorded, a carriage arm having a head slider provided at a tip thereof, the head slider moving over the disk during a read/write operation and being placed at an evacuated position outside an area of the disk during a halt of the disk apparatus, a support base, and a inertia latch mechanism which slides on the support base from an original position to a latch position in response to an impacting force so as to latch the carriage arm when the disk apparatus is impacted, and slides on the support base from the latch position to the original position by disengaging from the carriage arm after dissipation of the impacting force, wherein the support base and the inertia latch mechanism are in contact with each other through at least one raised portion that prevents a single surface-to-surface contact from being dominant between the support base and the inertia latch mechanism.

The raised portion or portions prevent a single surface-to-surface contact from being dominant between the support base and the inertia latch mechanism by establishing a point contact, a line contact, or a plurality of discontinuous surface contacts, thereby reducing an area of contact between the inertia latch mechanism and the support base. This reduces slide friction, and facilitates smooth sliding movement, thereby improving the reliability of an inertia latch mechanism.

According to another aspect of the present invention, a disk apparatus includes a disk in which information is recorded, a carriage arm having a head slider provided at a tip thereof, the head slider moving over the disk during a read/write operation and being placed at an evacuated position outside an area of the disk during a halt of the disk apparatus, a magnetic circuit which drives the carriage arm, a support base, and a inertia latch mechanism which slides on the support base from an original position to a latch position in response to an impacting force so as to latch the carriage arm when the disk apparatus is impacted, and slides on the support base from the latch position to the original position in response to an attraction force by disengaging from the carriage arm after dissipation of the impacting force, the inertia latch mechanism including a portion thereof made of a synthetic resin mixed with metal particles that respond to magnetism generated by the magnetic circuit so as to generate the attraction force.

In the disk apparatus described above, a portion of the inertia latch mechanism is made of a synthetic resin mixed with metal particles, and can thus be molded into any desired shape and size with sufficient accuracy. Use of this portion makes it possible to arrange mechanical parts accurately, so that a gap between this portion and the magnetic circuit can be made small, thereby increasing the force by which the magnetic circuit attracts the inertia latch mechanism.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figures 2A, 2B:
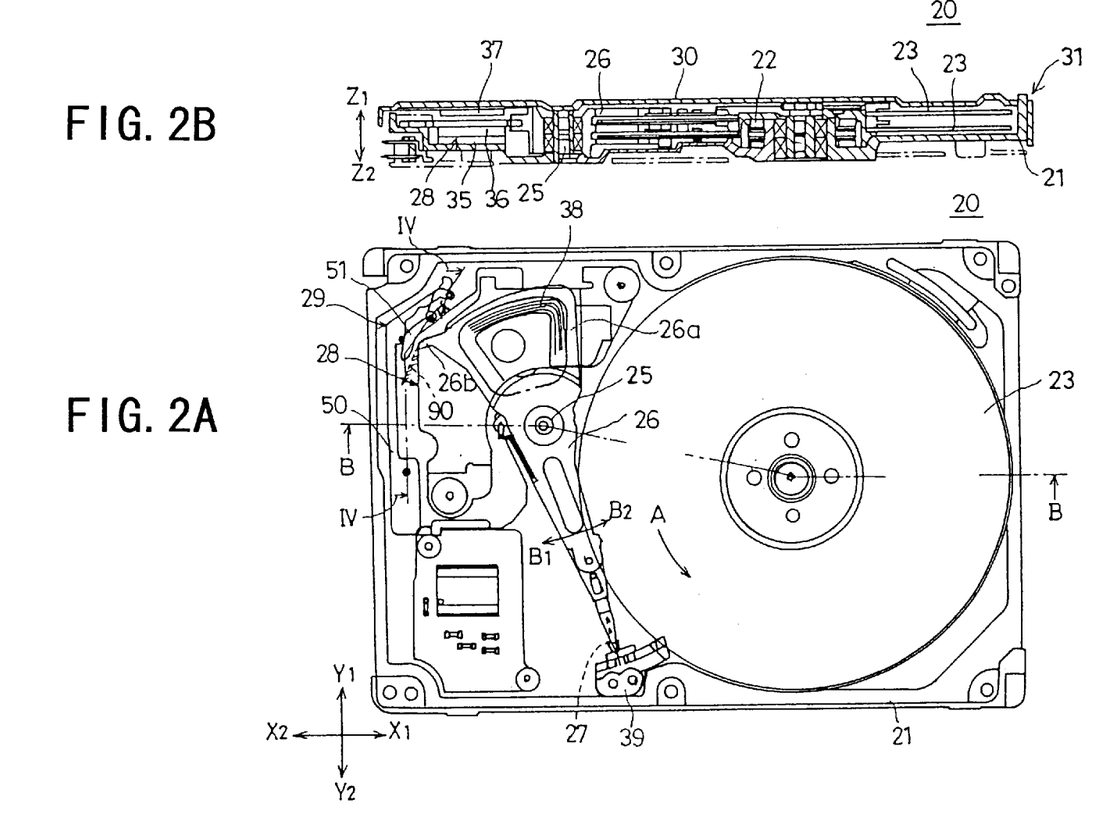
FIGS. 2A and 2B are illustrative drawings showing a hard-drive according to an embodiment of the present invention.

FIGS. 2A and 2B are illustrative drawings showing a 2.5-inch hard-drive 20 according to an embodiment of the present invention. This hard-drive is provided as a built-in component in a notebook-type computer. FIG. 2A shows the hard-drive 20 with a cover thereof removed. FIG. 2B shows a cross-sectional view of the hard-drive 20 taken along the line B—B in FIG. 2A. X1-X2 indicates a longitudinal direction, and Y1-Y2 indicates a transverse direction, with Z1-Z2 representing a direction along the height.

The hard-drive 20 includes a chassis base 21 having a shallow concave portion, a spindle motor 22 on the chassis base 21, two disks 23 having a diameter of 2.5 inches and fixed to the rotor of the spindle motor 22, a carriage arm 26 supported in such a manner as to swing around an axis 25 provided on the chassis base 21, a head slider 27 provided at the tip of the carriage arm 26, an actuator 28 provided on the upper surface of the chassis base 21 and having a voice-coil-motor configuration to swing the carriage arm 26 back and fourth, a ramp member 39 fixedly mounted to the chassis base 21, and an inertia latch mechanism 29 provided on the upper surface of the chassis base 21. The chassis base 21 and a upper cover 30 together make a disk enclosure 31, which is a sealed space. The disks 23 are contained in the disk enclosure 31. The actuator 28 includes a lower yolk 35, a magnet 36 fixedly mounted on the yolk 35, an upper yolk 37 covering the magnet 36, and a coil 38 having substantially a rectangular shape and provided as an integral portion of a base part 26a of the carriage arm 26. The yolk 35, the magnet 36, and the yolk 37 together constitute a magnetic circuit. The head slider 27 has a magnetic head on an end surface thereof.

The hard-drive 20 is used as a built-in component of notebook-type personal computers, and receives electric power from a buttery to operate. The operation will be described as follows.

The disks 23 is rotated at a few thousands rpm in a direction A by the spindle motor 22. The actuator 28 swings the carriage arm 26 in a direction B1-B2, so that the head slider 27 moves in a radial direction over the upper surface of the disks 23 by flying in the air. This makes it possible to scan a truck to be scanned, thereby allowing the magnetic head to perform the writing/reading of information.

When an unload command is supplied from the notebook-type personal computer, the carriage arm 26 swings in the direction towards B1 so as to be placed at an evacuation position as shown in FIG. 2A. The tip of the carriage arm 26 is supported by the ramp member 39, so that the head slider 27 is in an evacuated state, being out of the area of disks 23. Further, the spindle motor 22 halts operation thereof, thereby putting the hard-drive 20 in a suspension mode.

If a load command is supplied during the suspension mode, the spindle motor 22 starts rotating and the actuator 28 starts being driven. As a result, the carriage arm 26 is swung in the B2 direction, and is released from the ramp member 39, so that the head slider 27 is loaded onto the disks 23 that are rotating. The head slider 27 flies in the air over the surface of the disks 23, thereby attending to the writing and reading of information.

In the following, the inertia latch mechanism 29 will be described.

Figure 3:
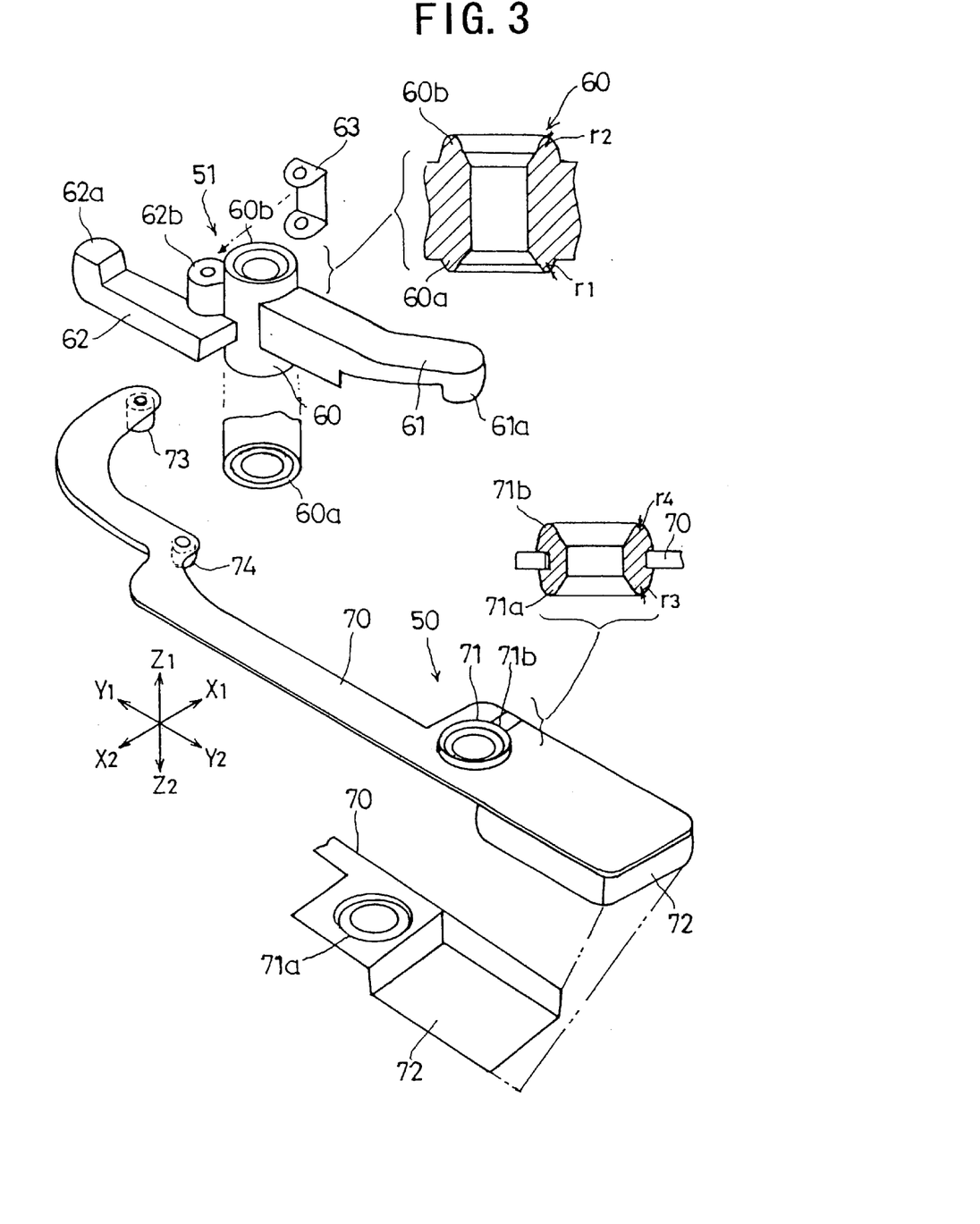
FIG. 3 is an illustrative drawing showing an inertia latch mechanism of the present invention.

FIG. 3 is an illustrative drawing showing the inertia latch mechanism 29. The inertia latch mechanism 29 includes an inertia balancing arm 50 and a latch arm 51 serving as a latch member. The latch arm 51 latches the carriage arm 26. The inertia balancing arm 50 stays at the same position when impact is given to the hard-drive 20 in such a direction as to swing the carriage arm 26, i.e., when the impact is given in the direction parallel to the X-Y plane in which the chassis base 21 extends. As a result, the latch arm 51 that moves together with the chassis base 21 is swung around an axis member 80.

The basis portion 26a of the carriage arm 26 has a horn portion 26b that projects substantially in the X2 direction in FIG. 2A. The latch arm 51 engages in the horn portion 26b.

As shown in FIG. 3, the latch arm 51 is a molded product made of synthetic resin, and includes a bearing 60, an arm 61 extending from the bearing 60 in one direction, an arm 62 extending from the bearing 60 in the opposite direction, a protrusion 61a projecting in the Z2 direction at the tip of the arm 61, a protrusion 62a projecting in the Z1 direction at the tip of the arm 62, and a protrusion 62b projecting in the Z1 direction at the base of the arm 62. The protrusion 62b at the base of the arm 62 has a U-shape steel member 63 engaged therein.

Figure 4:
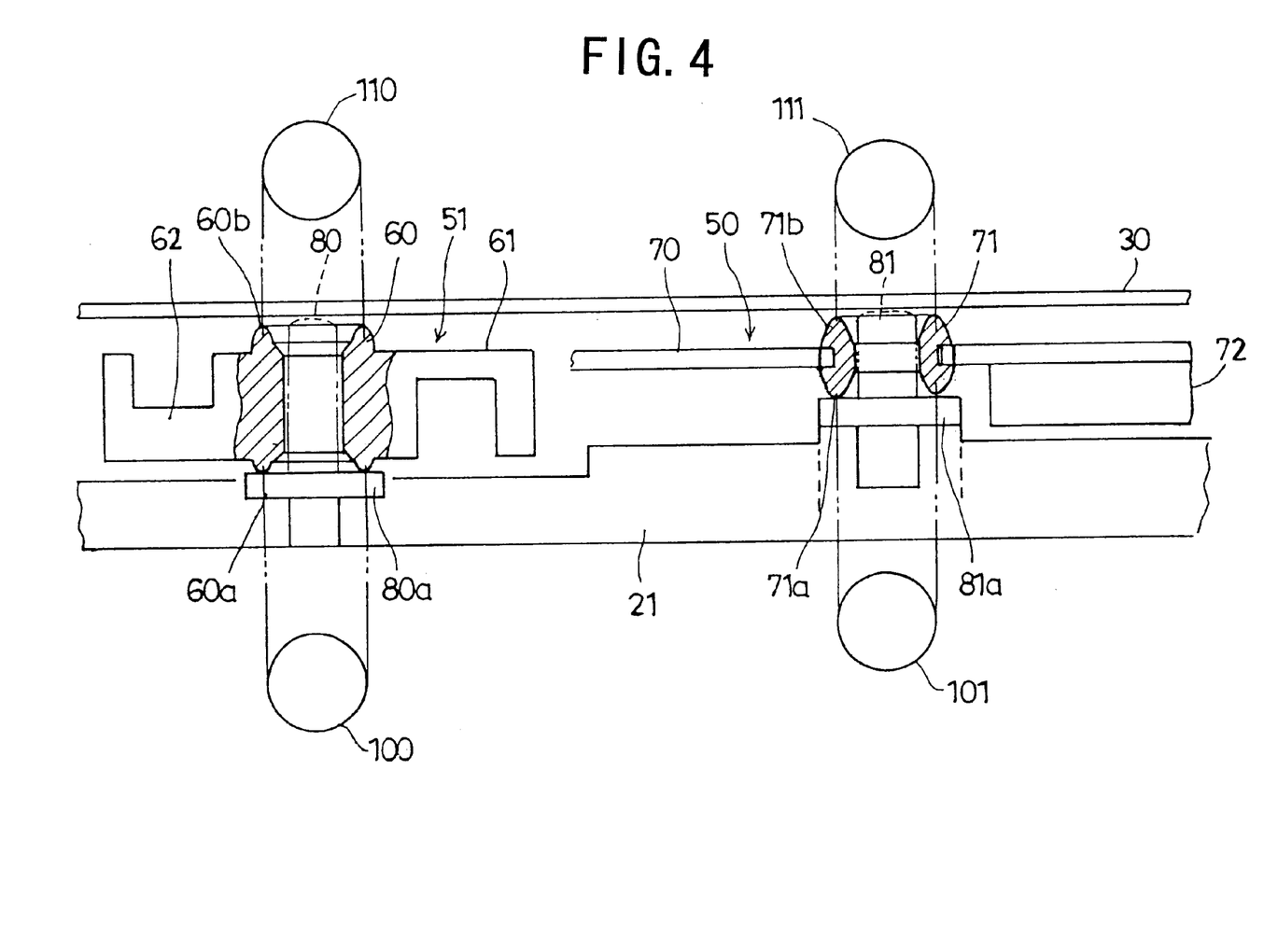
FIG. 4 is a cross-sectional view of the inertia latch mechanism taken along a line IV—IV in FIG. 2A.

The end of the bearing 60 on the Z2 side has a protrusion 60a projecting in the Z2 direction with a cross-sectional profile being a semicircle of a radius r1 and having a ring shape as shown in FIG. 4.

The end of the bearing 60 on the Z1 side has a protrusion 60b projecting in the Z1 direction with a cross-sectional profile being a semicircle of a radius r2 and having a ring shape as shown in FIG. 4.

The latch arm 51 is supported such as to be able to swing around the axis member 80 having the flange portion 80a where the axis member 80 sticks out from the chassis base 21 with a base thereof being buried therein as shown in FIG. 2A and FIG. 4. When the latch arm 51 swings counterclockwise to approach the actuator 28, the arm 61 comes into a trajectory 90 along which the horn portion 26b moves when the carriage arm 26 swings counterclockwise.

As shown in FIG. 3, the inertia balancing arm 50 includes an elongated arm body 70, a bearing 71 made of synthetic resin and forming an integral part of the arm body 70 near the end thereof facing the Y2 direction, a weight 72 fixed to the bottom surface of the arm body 70 at the end thereof facing the Y2 direction, and pins 73 and 74 fixedly attached to the Y1 end of the arm body 70 and at some distance from the Y1 end, respectively. The inertia balancing arm 50 has a size and shape that are balanced around the bearing 71 with respect to swinging movement, and has a relatively large inertia moment.

The Z2 end of the bearing 71 has a protrusion 71a projecting in the Z2 direction with a cross-sectional profile being a semicircle of a radius r3 and having a ring shape as shown in FIG. 4.

The Z1 end of the bearing 71 has a protrusion 71b projecting in the Z1 direction with a cross-sectional profile being a semicircle of a radius r4 and having a ring shape as shown in FIG. 4.

As shown in FIG. 2A and FIG. 4, the inertia balancing arm 50 is supported to swing around an axis member 81 having a flange portion 81a that sticks out from the chassis base 21 with a base portion thereof buried therein. The inertia balancing arm 50 is positioned close to the actuator 28. The plane in which the inertia balancing arm 50 swings is the same X-Y plane in which the carriage arm 26 swings.

In the following, the operation of the inertia latch mechanism 29 will be described.

The inertia latch mechanism 29 operates when the impact on the hard-drive 20 is given in such a direction to swing the carriage arm 26 counterclockwise during the suspension mode of the hard-drive 20 shown in FIG. 2A.

Figure 5A:
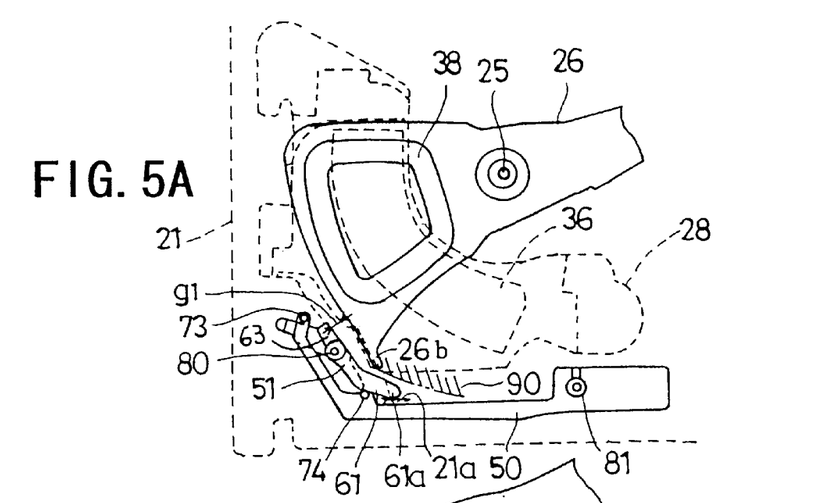
FIGS. 5A through 5C are illustrative drawings showing the operation of the inertia latch mechanism when the hard-drive is impacted.

When the hard-drive 20 is in the suspension mode, the inertia latch mechanism 29 is positioned as shown in FIG. 2A and FIG. 5A. The latch arm 51 is urged clockwise as the steel member 63 is attracted by the magnetic flux leaking from the magnetic circuit of the actuator 28, so that the protrusion 61a comes into contact with a step 21a of the chassis base 21, and the latch arm 51 is restricted from swinging further. The arm 61 is situated outside the trajectory 90. The pin 74 of the inertia balancing arm 50 is in contact with the X2-side lateral surface of the arm 61. A portion close to the Y1 end of the arm body 70 crosses the arm 62, and the pin 73 faces the X1-side lateral surface of the arm 62.

When impact is given to the hard-drive 20 in the X-Y plane to prompt a swing movement counterclockwise, the carriage arm 26 tries to swing counterclockwise from the position shown in FIG. 2A and FIG. 5A.

Figure 5B:
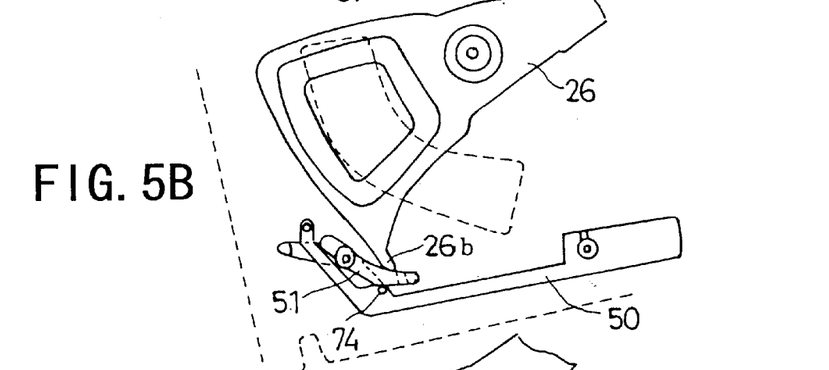
Figure 5C:
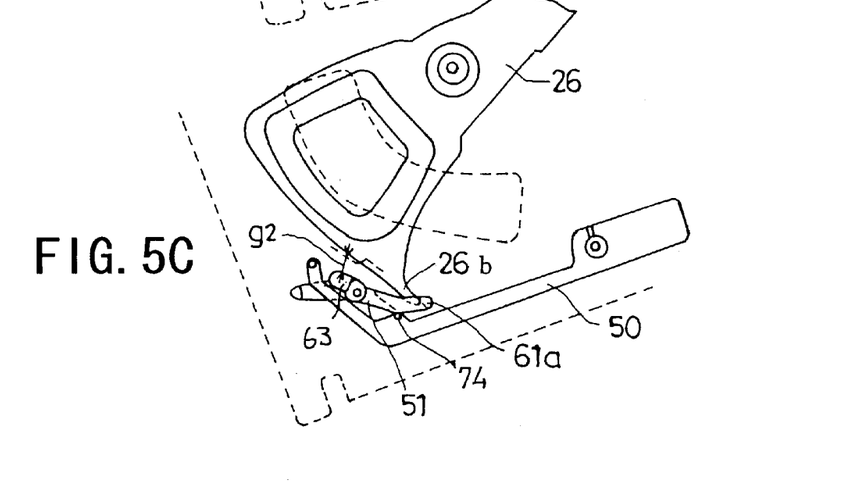

As shown in FIG. 5B, however, the inertia balancing arm 50 tries to stay in its original position because of its own inertia, so that latch arm 51 is swung counterclockwise by the pin 74, resulting in the arm 61 coming into the trajectory 90. The carriage arm 26 having started swinging counterclockwise is latched when the horn portion 26b engages in the protrusion 61a of the arm 61 as shown in FIG. 5C, and, thereafter, a further swinging movement is stopped. As a result, the head slider does not jump on to the halted disks 23 to destroy data recorded in the disks 23.

Figure 6A:
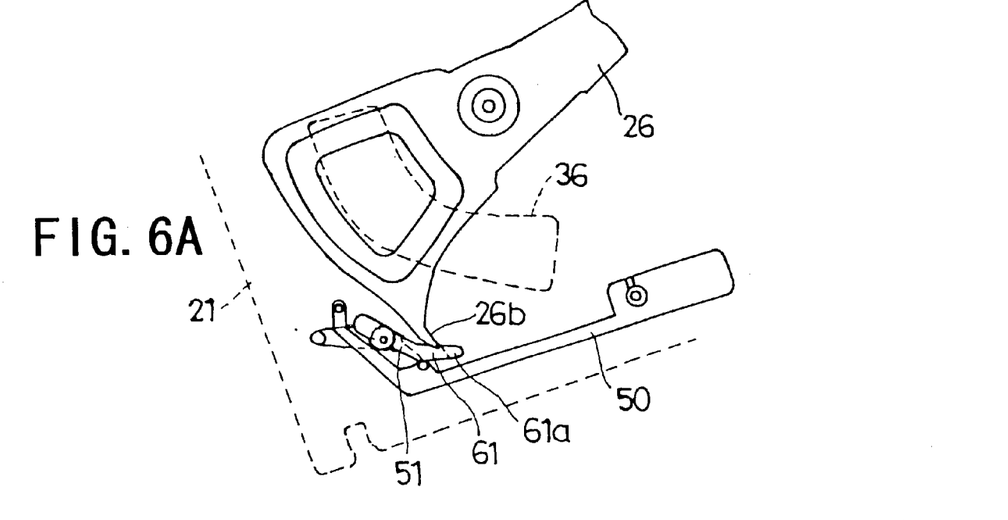
FIGS. 6 and 6B are illustrative drawings showing the operation of the inertia latch mechanism after dissipation of an impacting force.
Figure 6B:
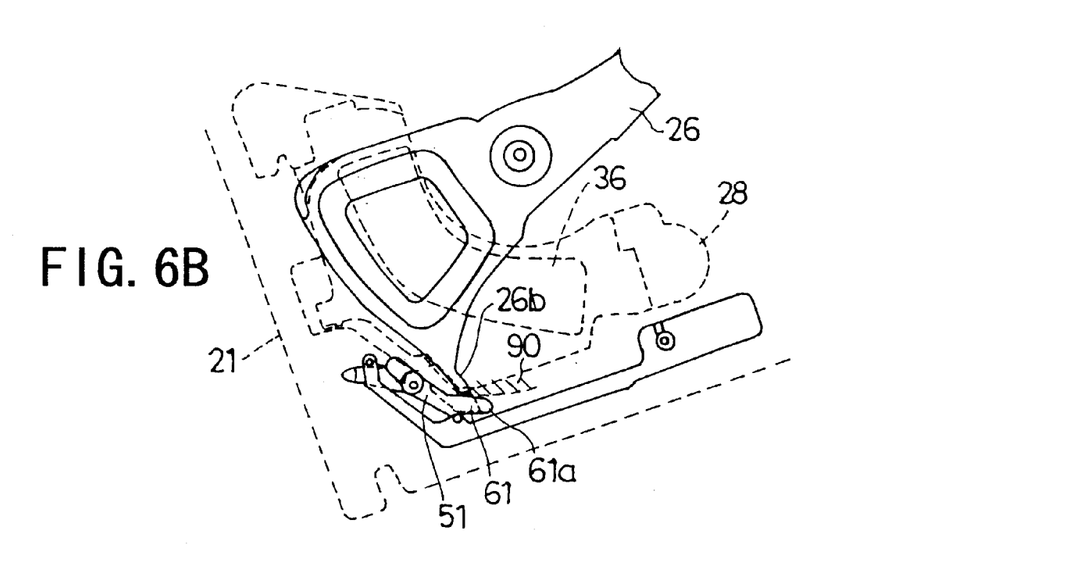

After the impacting force dissipates, the steel member 63 is attracted by the magnetic flux leaking from the magnetic circuit of the actuator 28, resulting in the latch arm 51 swinging clockwise, with the associated movement of the inertia balancing arm 50 swinging counterclockwise, as shown in FIG. 6A. In the end, the inertia latch mechanism 29 will return to its original position as shown in FIG. 6B. As the latch arm 51 swings, the latching of the horn portion 26b is disengaged, and the arm 61 moves out of the trajectory 90, with a resulting state in which the carriage arm 26 can swing clockwise.

The protrusion 60a of the latch arm 51 is in contact with the flange portion 80a of the axis member 80, so that a circular line contact 100 as shown in FIG. 4 is provided. In the same manner, the protrusion 71a of the inertia balancing arm 50 is in contact with the flange portion 81a of the axis member 81, so that a circular line contact 101 is provided.

When the inertia latch mechanism 29 returns from the state of FIG. 5C to the state of FIG. 6B via the state of FIG. 6A after the dissipation of impact, the latch arm 51 swings by sliding, overcoming the friction caused by the circular line contact between the protrusion 60a and the flange portion 80a. This slide friction is smaller than the slide friction that is caused by the surface-to-surface contact as shown in the related-art configuration of FIG. 1. Further, the inertia balancing arm 50 swings by sliding, overcoming the friction caused by the circular line contact between the protrusion 71a and the flange portion 81a. This slide friction is smaller than the slide friction that is caused by the surface-to-surface contact. With this provision, therefore, sliding of the latch arm 51 and the inertia balancing arm 50 is smoothly made, so that the inertia latch mechanism 29 can return from the state of FIG. 5C to the state of FIG. 6B via the state of FIG. 6A without failure. Accordingly, the carriage arm 26 swings in response to a load command, insuring a reliable operation of the hard-drive 20.

Further, since the cross-sectional profile of the protrusions 61a and 71a is a semicircular shape rather than a triangular shape, wearing does not take place as much, thereby producing little dust generated by wearing.

If the inertia balancing arm 50 is positioned upside down, the latch arm 51 has the protrusion 60b thereof in contact with the interior surface of the cover 30, so that a circular line contact 110 is established. By the same token, the inertia balancing arm 50 has the protrusion 71b thereof in contact with the interior surface of the cover 30, thereby providing a circular line contact 111. Accordingly, the latch arm 51 and the inertia balancing arm 50 are subjected to friction that is smaller than that of a surface-to-surface contact. Sliding of the latch arm 51 and the inertia balancing arm 50 can thus be smoothly made, thereby insuring that the inertia latch mechanism 29 returns from the state of FIG. 5C to the state of FIG. 6B via the state of FIG. 6A.

The configuration of the present invention that reduces the friction of sliding movement is applicable to a case in which a member for latching the carriage arm 26 travels along a straight line rather than swinging around a given axis.

In the following, variations of bearings of the latch arm 51 and the inertia balancing arm 50 will be described.

Figure 7A:
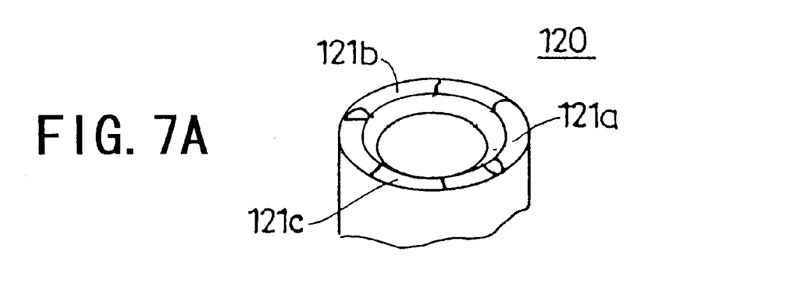
FIGS. 7A and 7B are illustrative drawings showing a first variation of a bearing.
Figure 7B:
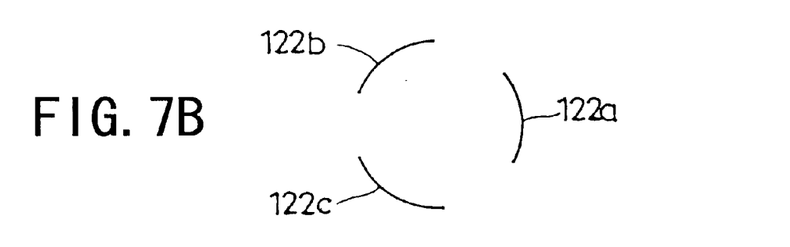

FIGS. 7A and 7B are illustrative drawings showing a first variation of the bearing. FIG. 7A shows a bearing 120, which provides a discontinuous line contact. The bearing 120 includes protrusions 121a, 121b, and 121c, which are not continuous with each other. The protrusions 121a, 121b, and 121c have a cross-sectional profile of a semicircular shape, and form arcs arranged at equal intervals along the circumference. This bearing 120 comes in contact with the flange portion 80a on arcs 122a, 122b, 122c as shown in FIG. 7B, which provide discontinuous line contact. The friction of the bearing 120 sliding on the flange portion 80a is reduced compared with that of a surface-to-surface contact.

Figure 8A:
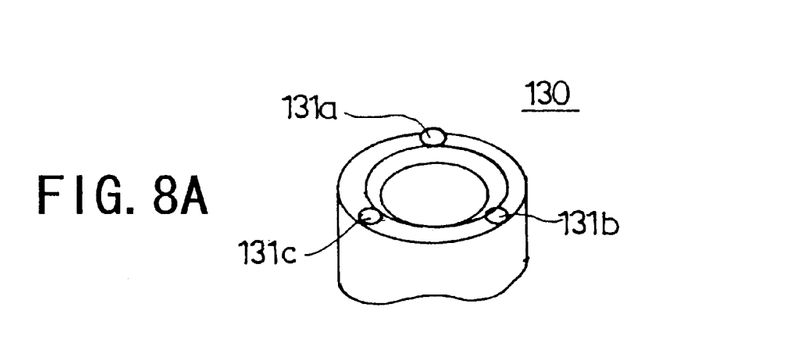
FIGS. 8A and 8B are illustrative drawings showing a second variation of the bearing.
Figure 8B:
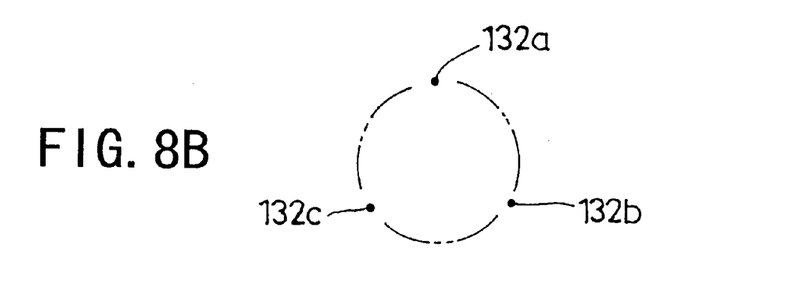

FIGS. 8A and 8B are illustrative drawings showing a second variation of the bearing. FIG. 8A shows a bearing 130, which provides point contacts. The bearing 130 includes hemispheres 131a, 131b, and 131c arranged at equal intervals along the perimeter. The bearing 130 comes in contact with the flange portion 80a on points 132a, 132b, 132c as shown in FIG. 8B, which provide point contacts. The friction of the bearing 130 sliding on the flange portion 80a is reduced compared with that of a surface-to-surface contact.

Figure 9A:
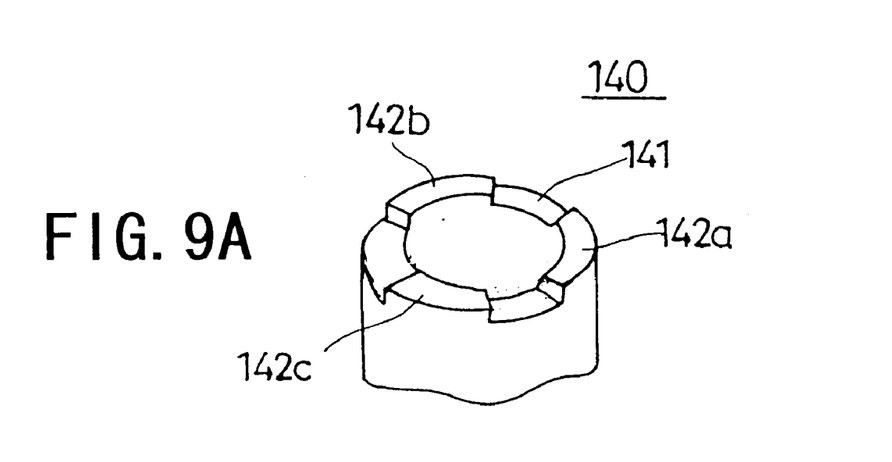
FIGS. 9A and 9B are illustrative drawings showing a third variation of the bearing.
Figure 9B:
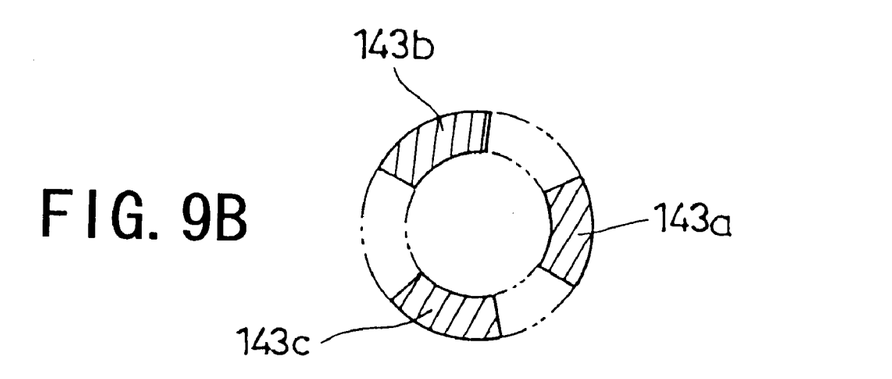

FIGS. 9A and 9B are illustrative drawings showing a third variation of the bearing. FIG. 9A shows a bearing 140 that includes arc surface portions 142a, 142b, and 142c having flat top surfaces, which are separated by recesses 141 arranged at equal intervals on the rim. The arc surface portions 142a, 142b, and 142c are discontinuous with each other. The bearing 140 comes in contact with the flange portion 80a on discontinuous surfaces 143a, 143b, 143c as shown in FIG. 9B. The friction of the bearing 140 sliding on the flange portion 80a is reduced compared with that of a surface-to-surface contact.

In the following, a variation of the cover and the axis member that supports the latch arm will be described with reference to FIGS. 10A through 10C.

This variation is directed to a configuration that provides line contact by forming protrusions on the axis member and the cover.

Figure 10A:
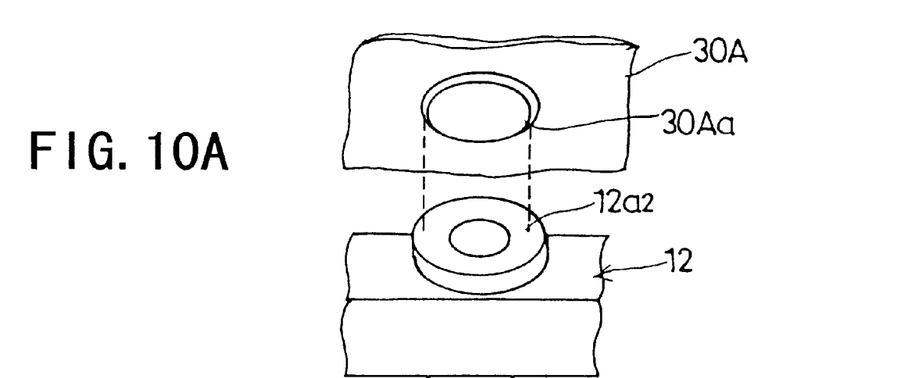
FIGS. 10A through 10C are illustrative drawings showing a variation of an axis member and a cover.
Figure 10B:
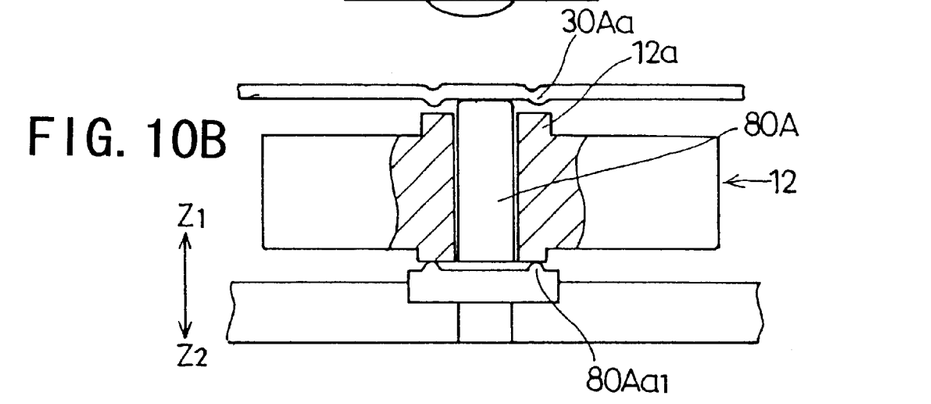
Figure 10C:
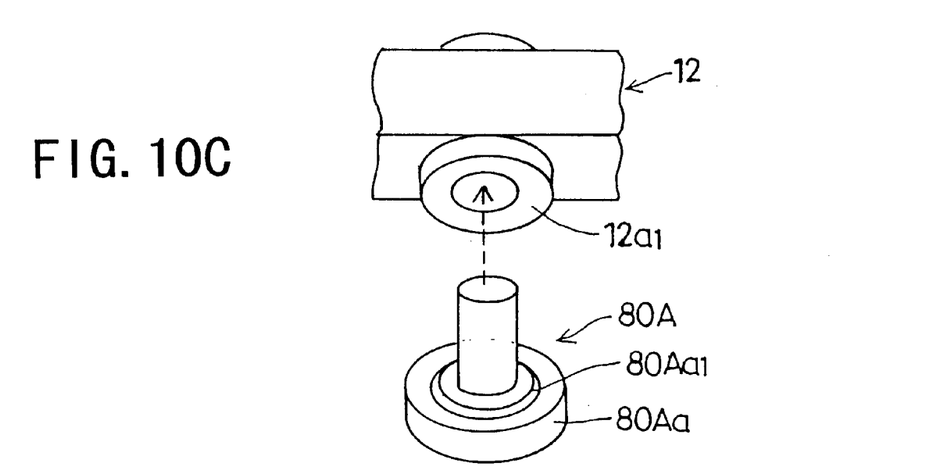

As shown in FIGS. 10A, 10B, and 10C, the bearing 12a of the latch arm 12 has the circular flat surfaces 12a1 and 12a2 at the bottom end and at the top end, respectively.

As shown in FIGS. 10B and 10C, an axis member 80A provided with a flange portion 80Aa has a protrusion 80Aa1 formed on the flange portion 80Aa where the protrusion 80Aa1 has a ring shape and a cross-sectional profile of a semicircular shape projecting in the Z1 direction. The circular flat surface 12a2 of the bearing 12a of the latch arm 12 is in contact with the ring-shape protrusion 80Aa1, thereby establishing line contact. In this case, friction of the bearing 12a sliding on the flange portion 80Aa is reduced compared with that of a surface-to-surface contact.

As shown in FIGS. 10A and 10B, a cover 30A has a ring-shape protrusion 30Aa formed at a position facing the bearing 12a where the ring-shape protrusion 30Aa has a cross-sectional profile of a semicircle projecting in the Z2 direction.

If the hard-drive is situated upside down, the circular flat surface 12a1 of the bearing 12a of the latch arm 12 comes in contact with the ring-shape protrusion 30Aa, thereby establishing a line contact. In this case, friction of the bearing 12a sliding on the cover 30A is reduced compared with that of a surface-to-surface contact.

In what follows, a variation of the latch arm will be described with reference to FIG. 11.

Figure 11:
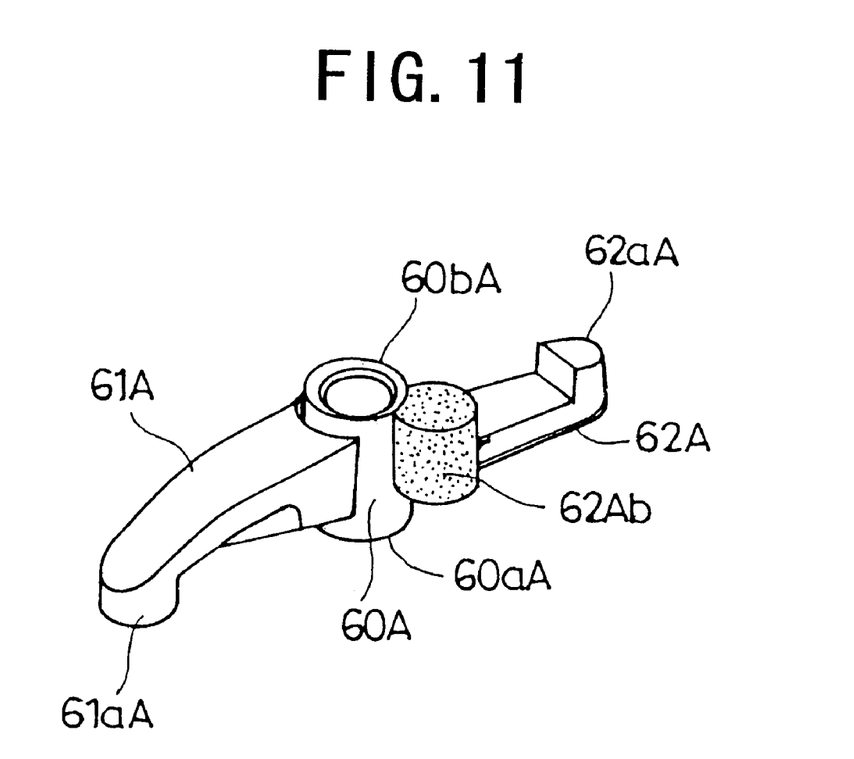
FIG. 11 is an illustrative drawing showing a variation of a latch arm.

A latch arm 51A of FIG. 11 is configured such that an increased attracting force is effected clockwise when the latch arm 51A is attracted by the magnetic flux leaking from the actuator 28.

The latch arm 51A has substantially the same configuration as the latch arm 51 as shown in FIG. 3, and counterpart components are designated by the same reference numerals with a suffix "A". The latch arm 51 is a two-part molded product. A portion excluding a protrusion 62Ab is made by molding synthetic resin first, and, then, the protrusion 62Ab shown by shading is made by molding a synthetic resin mixed with metal particles that exhibit magnetism. No U-shape steel member 63 as shown in FIG. 3 is employed in this configuration.

Figure 12A:
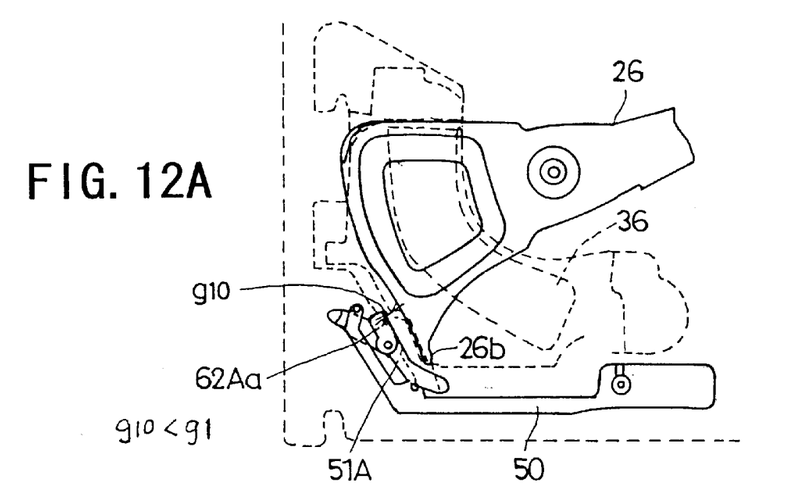
FIGS. 12A and 12B are illustrative drawings showing an inertia latch mechanism in operation where the variation of the latch arm is used.
Figure 12B:
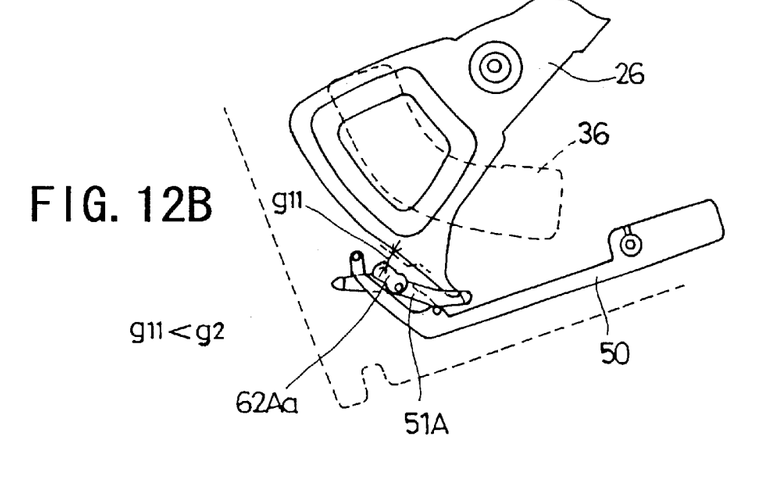

Since the protrusion 62Ab is molded in the cast, it is possible to form any shape, which provides greater latitude than use of an engaged structure of the steel member 63. Also, this provides a basis for improving the precision of shape and size. In the normal and routine position as shown in FIG. 12A, therefore, a gap g10 between the protrusion 62Ab and the actuator 28 can be set narrower than a gap g1 shown in FIG. 5A. In proportion, a gap g11 as shown in FIG. 12B between the protrusion 62Ab and the actuator 28 observed when the inertia latch mechanism 29 is in operation upon impact is narrower than a gap g2 shown in FIG. 5C. As a result, the magnetic flux leaking from the actuator 28 attracts the latch arm 51A clockwise with a stronger force than in the case of FIG. 3 in which the latch arm 51 is used.

Accordingly, the latch arm 51A swings and returns to its original position as shown in FIG. 12A after the dissipation of an impacting force.

Further, the present invention is not limited to these embodiments, but various variations and modifications may be made without departing from the scope of the present invention.

The present application is based on Japanese priority application No. 2001-343655 filed on Nov. 8, 2001, with the Japanese Patent Office, the entire contents of which are hereby incorporated by reference.

What is claimed is:

1. A disk apparatus, comprising:

a disk in which information is recorded;

a carriage arm having a head slider provided at a tip thereof, said head slider moving over said disk during a read/write operation and being placed at an evacuated position outside an area of said disk during a halt of said disk apparatus;

a support base; and an inertia latch mechanism which slides on said support base from an original position to a latch position in response to an impacting force so as to latch said carriage arm when said disk apparatus is impacted, and slides on said support base from the latch position to the original position by disengaging from said carriage arm after dissipation of said impacting force, wherein said support base and said inertia latch mechanism are in contact with each other through at least one raised portion that prevents a single surface-to-surface contact from being dominant between said support base and said inertia latch mechanism.

2. The disk apparatus as claimed in claim 1, wherein said inertia latch mechanism swings around an axis member and has a bearing that is supported by said axis member and slides on said support base, said bearing having a raised portion that establishes a line contact with said support base.

3. The disk apparatus as claimed in claim 2, wherein said bearing has a ring-shape raised portion that establishes a circular line contact with said support base.

4. The disk apparatus as claimed in claim 1, wherein said inertia latch mechanism swings around an axis member and has a bearing that is supported by said axis member and slides on said support base, said bearing having a plurality of protrusions, each of which establishes a point contact with said support base.

5. The disk apparatus as claimed in claim 1, wherein said inertia latch mechanism swings around an axis member and has a bearing that is supported by said axis member and slides on said support base, said bearing having a plurality of raised portions, each of which establishes a surface-to-surface contact with said support base.

6. The disk apparatus as claimed in claim 1, wherein said inertia latch mechanism swings around an axis member and has a bearing that is supported by said axis member and slides on said support base, said support base having a raised portion that establishes a line contact with said bearing.

7. The disk apparatus as claimed in claim 1, further comprising a magnetic circuit that drives said carriage arm, wherein said inertia latch mechanism includes a portion thereof made of a synthetic resin mixed with metal particles responsive to magnetism, said inertia latch mechanism returning from the latch position to the original position after the dissipation of said impacting force by being attracted by magnetic flux generated by said magnetic circuit.

8. A disk apparatus, comprising:

a disk in which information is recorded;

a carriage arm having a head slider provided at a tip thereof, said head slider moving over said disk during a read/write operation and being placed at an evacuated position outside an area of said disk during a halt of said disk apparatus;

a magnetic circuit which drives said carriage arm;

a support base; and an inertia latch mechanism which slides on said support base from an original position to a latch position in response to an impacting force so as to latch said carriage arm when said disk apparatus is impacted, and slides on said support base from the latch position to the original position in response to an attraction force by disengaging from said carriage arm after dissipation of said impacting force, said inertia latch mechanism including a portion thereof made of a synthetic resin mixed with metal particles that respond to magnetism generated by said magnetic circuit so as to generate said attraction force.

* * * * *